United States Patent [19]

Nugent

[11] Patent Number: 5,398,317
[45] Date of Patent: Mar. 14, 1995

[54] SYNCHRONOUS MESSAGE ROUTING USING A RETRANSMITTED CLOCK SIGNAL IN A MULTIPROCESSOR COMPUTER SYSTEM

[75] Inventor: Steven F. Nugent, Portland, Oreg.

[73] Assignee: Intel Corporation, Santa Clara, Calif.

[21] Appl. No.: 177,210

[22] Filed: Jan. 4, 1994

Related U.S. Application Data

[60] Continuation of Ser. No. 14,775, Feb. 8, 1993, abandoned, which is a division of Ser. No. 752,957, Aug. 28, 1991, abandoned, which is a continuation of Ser. No. 298,551, Jan. 18, 1989, abandoned.

[51] Int. Cl.⁶ ............................................. G06F 13/00
[52] U.S. Cl. .................................. 395/200; 364/240.9; 364/241.9; 364/DIG. 1
[58] Field of Search ............................ 395/200; 370/90

[56] References Cited

U.S. PATENT DOCUMENTS

| | | | |
|---|---|---|---|
| 3,979,733 | 9/1976 | Fraser | 340/172.5 |
| 4,373,183 | 2/1983 | Means et al. | 364/200 |
| 4,710,893 | 12/1987 | McCutcheon et al. | 364/900 |
| 4,782,483 | 11/1988 | Lambert et al. | 370/90 |
| 4,805,170 | 2/1989 | Fergeson et al. | 370/89 |
| 4,947,317 | 8/1990 | DiGiulio et al. | 364/200 |
| 4,998,245 | 3/1991 | Tanaka et al. | 370/85.1 |
| 5,008,882 | 4/1991 | Peterson et al. | 370/94.3 |

Primary Examiner—Christopher B. Shin
Attorney, Agent, or Firm—Blakely, Sokoloff, Taylor & Zafman

[57] ABSTRACT

A parallel processing computer system having an improved architecture for communication of information between nodes. The computer system of the present invention comprises at least three nodes; each of the three nodes for processing information. Each of the nodes comprises a routing means for routing information between nodes. The routing means allow reservation of a route through the network of nodes. Messages may then be transmitted from an origin node to a destination node over the reserved route. Use of a route reservation system reduces requirements for buffering of information at intermediate nodes on a route, improves message passing latency and increases node-to-node bandwidth. The present invention teaches communication of messages between nodes in a synchronous manner.

2 Claims, 10 Drawing Sheets

FIG_1

FIG.-2A. ROUTER ARCHITECTURE

FIG._5  PHYSICAL CHANNEL

FIG_6  PHASE 2: ACKNOWLEDGEMENT

FIG._7 PHASE 3: MESSAGE TRANSMISSION

FIG. 11 PHASE 4: RELEASING CONNECTIONS

SYNCHRONOUS MESSAGE ROUTING USING A RETRANSMITTED CLOCK SIGNAL IN A MULTIPROCESSOR COMPUTER SYSTEM

This is a continuation of application Ser. No. 08/014,775, filed Feb. 8, 1993, abandoned, which is a divisional of application Ser. No. 07/752,957, filed Aug. 28, 1991, abandoned, which is a continuation of Ser. No. 07/298,551, filed Jan. 18, 1989, abandoned.

BACKGROUND OF THE INVENTION

1. Field of the invention

The present invention relates to the field of parallel processing computer systems.

2. Prior Art

A number of parallel processing computer systems are well known in the prior art. Generally, in such systems a large number of processors are interconnected in a network. In such networks each of the processors may execute instructions in parallel. In general, such parallel processing computer systems may be divided into two categories: (1) a single instruction stream, multiple data stream system (SIMD) and (2) a multiple instruction stream, multiple data system stream (MIMD) system. In a SIMD system, each of the plurality of processors simultaneously executes the same instruction on different data. In MIMD system, each of the plurality of processors may simultaneously execute a different instruction on different data.

In either SIMD or MIMD system, some means is required to allow communication between processors in the computer system. In such systems it is known to organize logically organize processors in an n-cube. A discussion of such n-cube systems may be found in Herbert Sullivan and T. R. Bashkow, *A Large Scale Homogeneous, Fully Distributed Parallel Machine, Proceedings of the 4th Annual Symposium on Computer Architecture*, pp. 105–117, 1977. Sullivan et al. discusses a number of interconnection structures including connection of processors on a boolean n-cube. The described boolean n-cube is an interconnection of N ($N=2^n$) processors which may be thought of as being placed at the corners of an n-dimensional cube. Sullivan et al. discloses the location of a processor may be described by designating one processor as the origin with a binary address of (0,0, . . . 0) of n bits. Other processors may then have their locations expressed as an n bit binary number in which each bit position is regarded as a coordinate along one of the n-dimensions. In such a system, when one processor is directly linked to another, their addresses will differ in just one bit. The position of this bit indicates the direction in n-space along which communication between the processors takes place. Thus, the address of one processor with respect to a neighboring processor differs by only one bit.

Sullivan et al. describes that in such a system a relative address may be computed by taking the bit-by-bit sum (modulo 2) of the addresses of two processors. This bit-by-bit summation is the equivalent of taking an exclusive OR of the two addresses. The number of nonzero bits in the resulting relative address represents the number of links which must be traversed to get from one processor to another.

U.S. Pat. No. 4,598,400 Hill is describes a similar n-cube parallel processing computer system in which an array of nodes are interconnected in a pattern of two or more dimensions and communication between the nodes is directed by addresses indicating displacement of the nodes. Hillis specifically discloses a system in which a message packet may be routed from one node to another in a n-cube network. The message packet comprises relative address information and information to be communicated between the nodes.

Many known parallel processing computer systems utilize a store-and-forward mechanism for communicating messages from one node to another. The Hillis system describes such a store-and-forward mechanism. Such store-and-forward mechanisms are more clearly described in Parviz Kermani and Leonard Kleinrock, *Virtual Cut-Through: A new Computer Communication Switching Technique*, Computer Networks, Vol. 3, 1979, pp. 267–286. Kermani et al. distinguishes store-and-forward systems from circuit switching systems. Specifically, a circuit switching system is described as a system in which a complete route for communication between two nodes is set up before communication begins. The communication route is then tied up during the entire period of communication between the two nodes. In store-and-forward (or message) switching systems, messages are routed to a destination node without establishing a route beforehand. In such systems, the route is established dynamically during communication of the message, generally based on address information in the message. Generally, messages are stored at intermediate nodes before being forwarded to a selected next node. Kermani et al. further discusses the idea of packet switching systems. A packet switching system recognizes improved utilization of resources and reduction of network delay may be realized in some network systems by dividing a message into smaller units termed packets. In such systems, each packet (instead of message) carries its own addressing information.

Kermani et al. observes that extra delay is incurred in known systems because a message (or packet) is not permitted to be transmitted from one node to the next before the message is completely received. Therefore, Kermani et al. discloses an idea termed "virtual cut-through" for establishing a communication route. The virtual cut-through system is a hybrid of circuit switching and packet switching techniques in which a message may begin transmission on an outgoing channel upon receipt of routing information in the message packet and selection of an outgoing channel. This system leads to throughput times exactly the same as in a store-and-forward system in the case of all intermediate channels being busy. In the case all intermediate nodes being idle, this system leads to throughput times similar to a circuit switched system. However, the system disclosed by Kermani et al. still requires sufficient buffering to allow an entire message to be stored at each node in the case of channels being busy.

W. J. Dally, *A VLSI Architecture for Concurrent Data Structures*, Ph.D Thesis, Department of Computer Science, California Institute of Technology, Technical Report 5209, March 1986, discusses a message-passing concurrent architecture to achieve a reduced message passing latency. In Chapter 3, Dally discusses a balanced binary n-cube architecture.

In Chapter 5, Dally discusses an application for reducing message latency. In general, Dally discloses use of a wormhole routing method, rather than a store-and-forward method. A wormhole routing method is characterized by a node beginning to forward each byte of a message to the next node as the bytes of the message arrive, rather than waiting for the next arrival of the entire packet before beginning transmission to the next node. Wormhole routing thus results in message latency which is the sum of two terms, one of which depends on the message length L and the other of which depends on the number of communications channels traversed D. Store-and-forward routing yields latency which depends on the product of L and D. (See Dally at page 153).

A further advantage of a wormhole routing method is that communications do not use up the memory bandwidth of intermediate nodes. In the Dally system, packets do not interact with the processor or memory of intermediate nodes along the route, but rather remain strictly within a routing chip network until they reach their destination.

However, the Dally discloses a self-timed system, permitting each processing node to operate at its own rate with no global synchronization. (See Dally at page 153).

Dally at pages 154–157 further discloses a message packet containing comprising relative X and Y address fields, a variable size data field comprising a plurality of non-zero data bytes and a tail byte.

It is desired to develop an improved method of communication between nodes in a parallel processing computer system.

As another objective of the present invention, it is desired to develop a parallel processing computer system having reduced message passing latency and increased node-to-node channel bandwidth.

As another object of the present invention, it is desired to develop a system which efficiently passes messages without requiring buffering for message packets at each node.

As another object of the present invention, it is desired to develop a system in which data communicated within a system is controlled by a clock communicated with the data.

SUMMARY OF THE INVENTION

A parallel processing computer system is described. The present invention comprises a computer system having a plurality of processing nodes which are interconnected in a binary n-cube. Each node comprises a processing means for processing information and a router means for routing information between nodes in the n-cube.

The router means accepts address information from the processing means and communicates the address information from node-to-node to establish a communication route for information from an origin node to a destination node. After a communication route is established, the destination node responds over the same route, in reverse order, with an acknowledgement that it is ready to accept information.

Communication of information then commences over the reserved route. At the completion of communication of information, the route is released and channels used by the route are made available for communication between other nodes.

In the present invention, each router means comprises two channels for communication of information. A first channel is utilized to transmit information from from a node to an adjacent node and a second channel is utilized to receive information from adjacent nodes. The present invention allows communication of information between nodes under control of a clock transmitted with the information. Each of the channels comprises means for communication of data information (both actual message data and status/control information) and for communication of clocking information for controlling transmission and reception of the data information.

BRIEF DESCRIPTION OF THE DRAWINGS

FIG. 8 is a diagram illustrating release of a route in a networked computer system as may be accomplished by the present invention.

DETAILED DESCRIPTION OF THE PRESENT INVENTION

A parallel processing computer system is described. In the following description, numerous specific details are set forth in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

The present invention relates to parallel processing computer systems. The preferred embodiment of the present invention is commercially available under the tradename iPSC/2 TM from Intel Corporation of Santa Clara, Calif. The iPSC/2 TM computer is a second generation concurrent processing computer system. The routing system of the iPSC/2 TM is more fully described in Steven F. Nugent, *The iPSC/2 TM Direct-Connect TM Communications Technology*, Intel Scientific Computers, distributed Hypercube Conference, Jan. 19–20, 1988.

OVERVIEW OF THE PRESENT INVENTION

The present invention discloses a direct connection routing mechanism which provides for improved performance over known parallel processing computer systems. The direct connection mechanism enhances performance in parallel processing computer systems by reducing message passing latency, increasing nodeto-node bandwidth and allowing for simultaneous bidirectional message traffic between any two nodes.

The direct connect routing system is a hardware controlled message passing system comprising a plurality of routers, each router coupled with a computation nodes, the routers for allowing passing of messages of arbitrary size between pairs of computational nodes. The routers form a circuit-switched network that dynamically creates a route, from a source node to a destination node. The route remains open for the duration of the message. The route comprises a series of channels that form a unique route from the source node to the destination node. The route may pass through some number of intermediate nodes in defining the route. The route allows transmission of data and a clock controlling transmission of the data over the same route.

Channels in the preferred embodiment of the present invention are bit-serial and full duplex and provide connection from one node to its nearest neighbor nodes in n-space. In the preferred embodiment, a router supports connections for up to eight full duplex channels and may be interconnected to form networks of up to seven dimensions containing 128 nodes. It is obvious to one of ordinary skill in the art that alternative embodiments may be constructed having a greater, or fewer, number of dimensions and/or nodes.

Each of the eight channels is routed independently, allowing up to eight messages to be routed simultaneously. In the preferred embodiment, one channel per router is dedicated to act as an external route into the network and allows remote devices to access the full routing capabilities of the network.

The router communicates with its computational node over two unidirectional parallel buses.

Routing in the preferred embodiment is based on the n-cube routing algorithm discussed in Sullivan et al,. This algorithm guarantees a deadlock free network. As will be described in more detail below, in the present invention, routes are dynamically constructed for each message prior to its transmission. A complete route is built in a step-by-step process in which route segments are arbitrated from at each router. After a route is defined, the channels which constitute the route are held for the duration of the message. Transmission of a message begins when the destination node is ready to begin accepting the message and channels are released when the end of the message passes through the routers connected by the channel.

The direct connection routing system of the present invention is a variation on wormhole routing discussed by Dally. As one inventive aspect of the present invention, the message is transmitted after the route is established, rather than establishing the route as part of the transmission of the message as discussed by Dally. This aspect of the present invention allows the system to operate completely synchronously and reduces or eliminates the need for flow control buffering in intermediate routers.

In the present invention, a routing probe comprising relative address information is first transmitted from router to router in the network in order to establish a route between an origin node and a destination node. After the route is established the message is communicated between the two nodes. Further, the present invention provides separate circuitry, from the computation circuitry of a node, for controlling routing. Using these aspects of the present invention message passing latency is significantly reduced over known systems. As discussed above, such known systems largely utilized store-and-forward, packet switching networks.

Using the above described techniques, messages are routed from an origin node to a destination node encountering minimal delays in routing through intermediate nodes. Further, the routing of messages through intermediate nodes does not require interruption of processes on those nodes or flow control buffering at the intermediate nodes.

The preferred embodiment of the present invention implements routers using programmable gate arrays.

Figure 1:
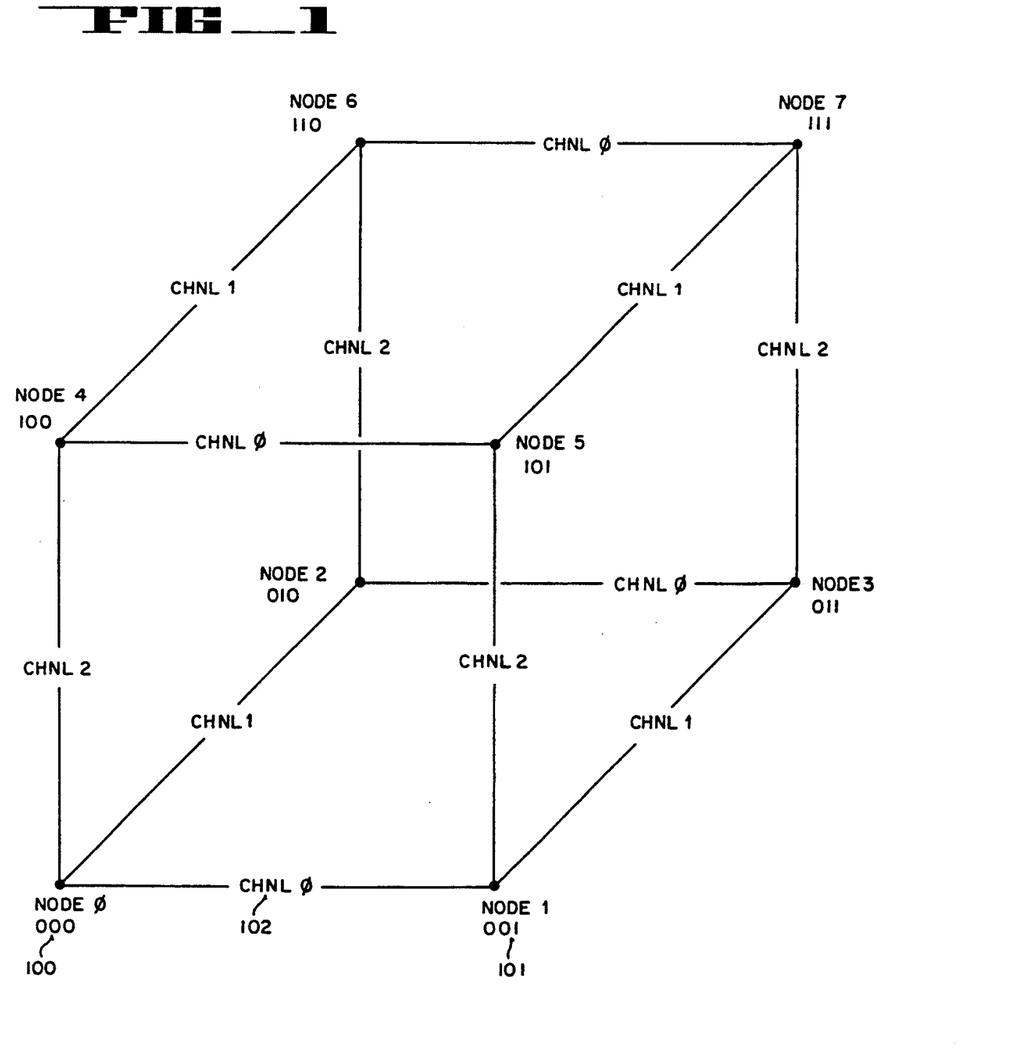
FIG. 1 is a diagram illustrating a n-cube network of processors as may be utilized by the present invention.

The preferred embodiment comprises a collection of single board processors or nodes interconnected with full duplexed, bit-serial channels to form a cube where each node has N nearest neighbor nodes. The system is then said to have a dimension N. The preferred embodiment comprises 128 nodes where N equals 7. Referring to FIG. 1, channel and node naming conventions used herein are illustrated. FIG. 1 illustrates a cube having a dimension 3.

In the preferred embodiment, nodes are assigned unique addresses so that the address of any two nearest neighbor nodes differ by one binary digit. For example, the address of node 0 100 is 000. The address of node 1 101, one of node 0's 100 nearest neighbors, is 001. Therefore, these two nodes' addresses differ only in one binary digit.

The present invention defines the dimension of the channel between any two nodes by taking the binary Exclusive OR of the addresses of the two nodes. After taking the binary Exclusive OR, the bit position remaining a one (bit position 0, 1 or 2 in the case of FIG. 1) is the channel number. For example, after taking the Exclusive OR of 000 and 001, the address of node 0 100 and node 1 101, respectively, the result is 001. As can be seen, in the result, bit position 0 is a one. Therefore, these two nodes are connected by a channel being designated as having dimension 0, channel 0 102.

Although the preferred embodiment calculates a relative address at the origin node and transmits the relative address from node-to-node to establish the route, several alternative embodiments are available. For example, in one alternative embodiment, the destination node's absolute address is routed from node-to-node. At each node, the relative address is computed based on the destination node's absolute address and the address of the current node. This relative address is used for determining the channel on which to transmit to the next node.

ROUTER ARCHITECTURE

Figure 2A:
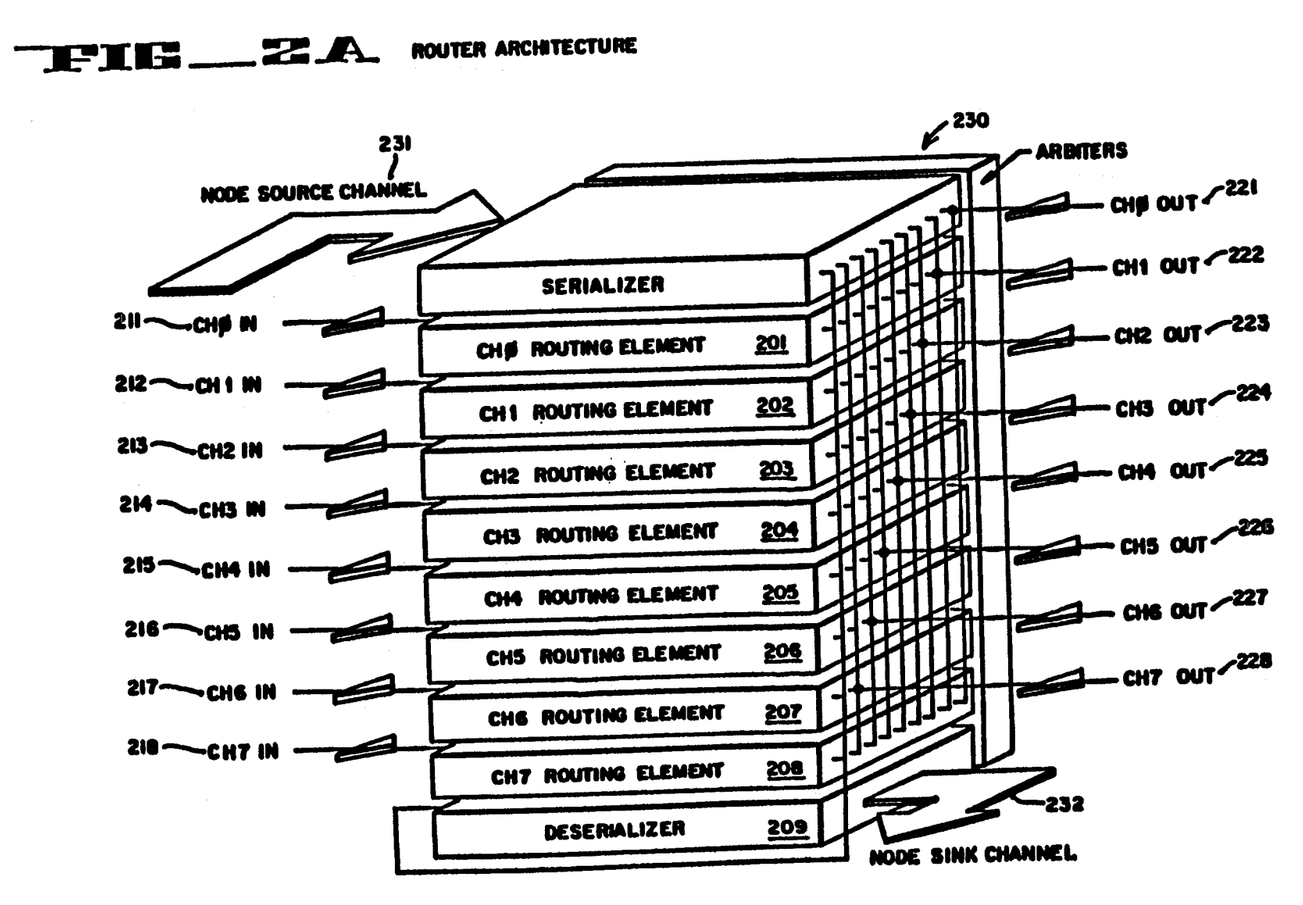
FIG. 2(a) is a block diagram illustrating a router architecture of the present invention.

FIG. 2(a) illustrates a router of the present invention. The router of the preferred embodiment comprises eight independent routing elements 201-208, one for each of eight incoming channels (numbered 0-7) 211-218. The routing elements 201-208 dynamically create message routes through modules of the computer system of the present invention. Each routing element 201-208 is capable of driving several outgoing channels 221-228, one at a time. Since more than one routing element 201-208 may request the same outgoing channel 221-228 simultaneously, an arbitration mechanism 230 is provided for resolving conflicts.

The router of the preferred embodiment further comprises two unidirectional parallel channels, a node source 231 and a node sink 232. Any of the routing elements 201-208 may request the node sink channel 232 for output and, likewise, the node source channel 231 has access to all outgoing channels 221–228.

In the preferred embodiment, the channel 7 routing element 208 operates as a remote I/O port. This provides an I/O gateway into and out of the network for remote devices such as disk farms, graphics devices and real time I/O. In the preferred embodiment, channel 7 of node 0 serves as the host interface. Channel 7 of other nodes are general purpose and used in the currently preferred embodiment as I/O gateways to disk farms.

As will be explained in more detail below, the present invention provides for routing of a routing probe from a origin node to a destination. The routing of the routing probe acts to reserve a route for subsequent transmission of a message. This reserved route may be referred to as a primary message route.

STATUS ROUTES

In addition to the primary message routes, the preferred embodiment provides a secondary route, referred to as the status route, which routes status information from the destination node to the source node of each message. The status route is used in the preferred embodiment to provide flow control for messages. To pass status information between routers, status information is multiplexed onto the channels during message transmission. In the absence of messages, status information is passed continuously.

To support establishment of status routes, routers of the preferred embodiment comprise send status logic. This status logic is illustrated with reference to FIG. 2(b). The send status logic allows status information, indicating the destination node is ready to receive a message, to be routed from the destination node through intermediate nodes back to the origin node. Each router is capable of routing status information for eight simultaneous messages. The destination ready status information is passed from the destination node back to the origin node over the same intermediate nodes, in the opposite direction, from the message.

As discussed above, in the preferred embodiment, status information is multiplexed with data during message transmission. As can be seen with reference to FIG. 2(b), send status information is provided from status switch 256 on send status lines 257 to the output channels 258. This status information is multiplexed with the data on channel out lines Ch0–Ch7 251.

Figure 2B:
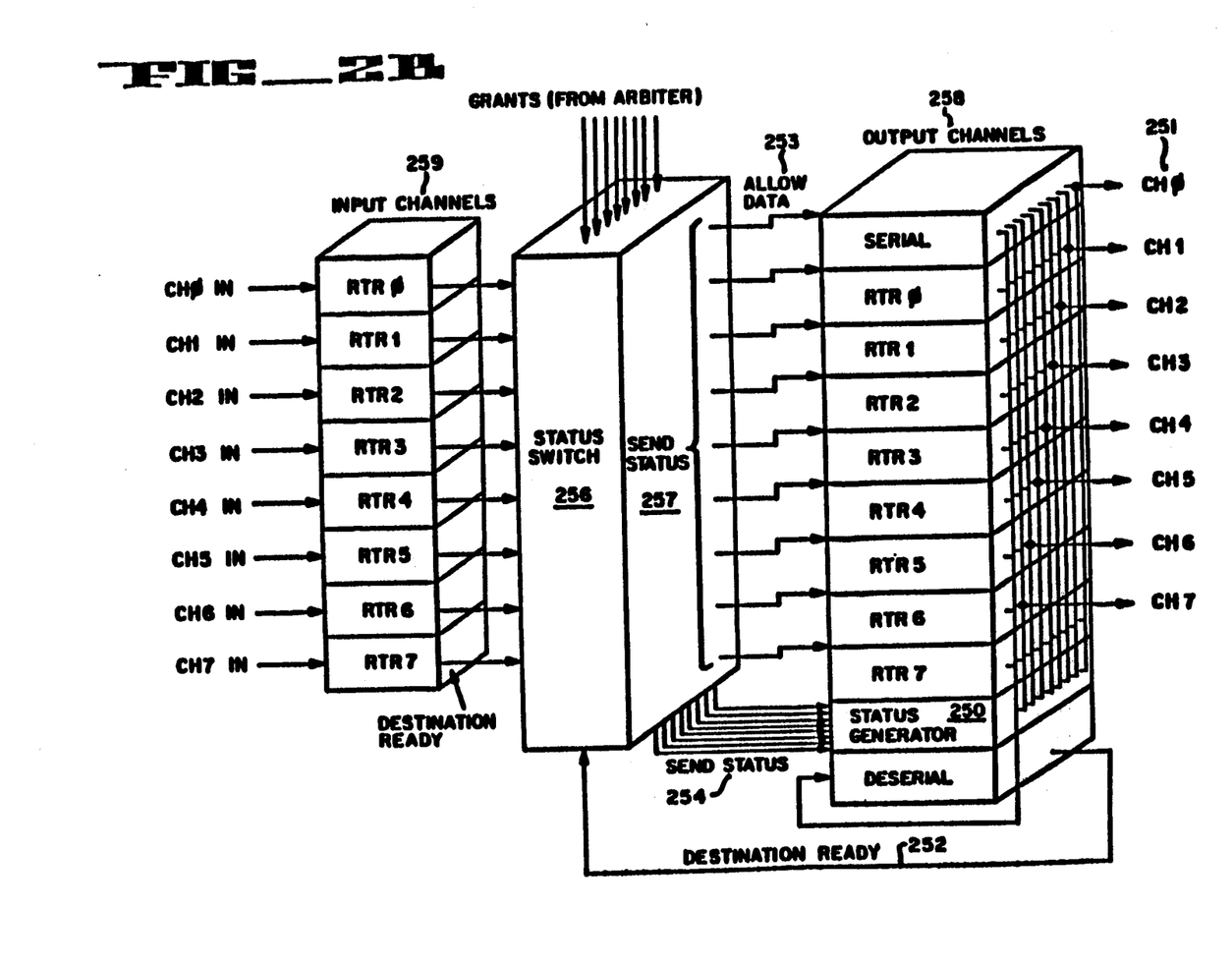
FIG. 2(b) is a block diagram illustrating organization of status route as may be utilized by the present invention.

In the absence of message traffic, status generator 250 provides status information to be sent out over lines Ch0–Ch7 251. Status generator 250 provides the same send status as provided to the the routers on input channels 259 for all channels that are idle. This status information is provided to status generator 250 over send status lines 254.

It will be obvious to one of ordinary skill in the art that alternative techniques may be utilized for communication of status information. For example, direct wiring of nodes may be utilized for communication of status information. Alternatively, explicit status messages may be transmitted. Each of these techniques will have various advantages and disadvantages.

Responsive to receiving a routing probe at the destination probe, the destination ready signal is originated by the destination node, generated by the deserializer and output on line 252. After passing through any intermediate routers, the signal arrives at the source router serializer as an Allow Data control signal on line 253. The Allow Data signal, as the name implies, controls the transmission of data from the source router serializer.

CHANNEL DESCRIPTION

Figure 3:
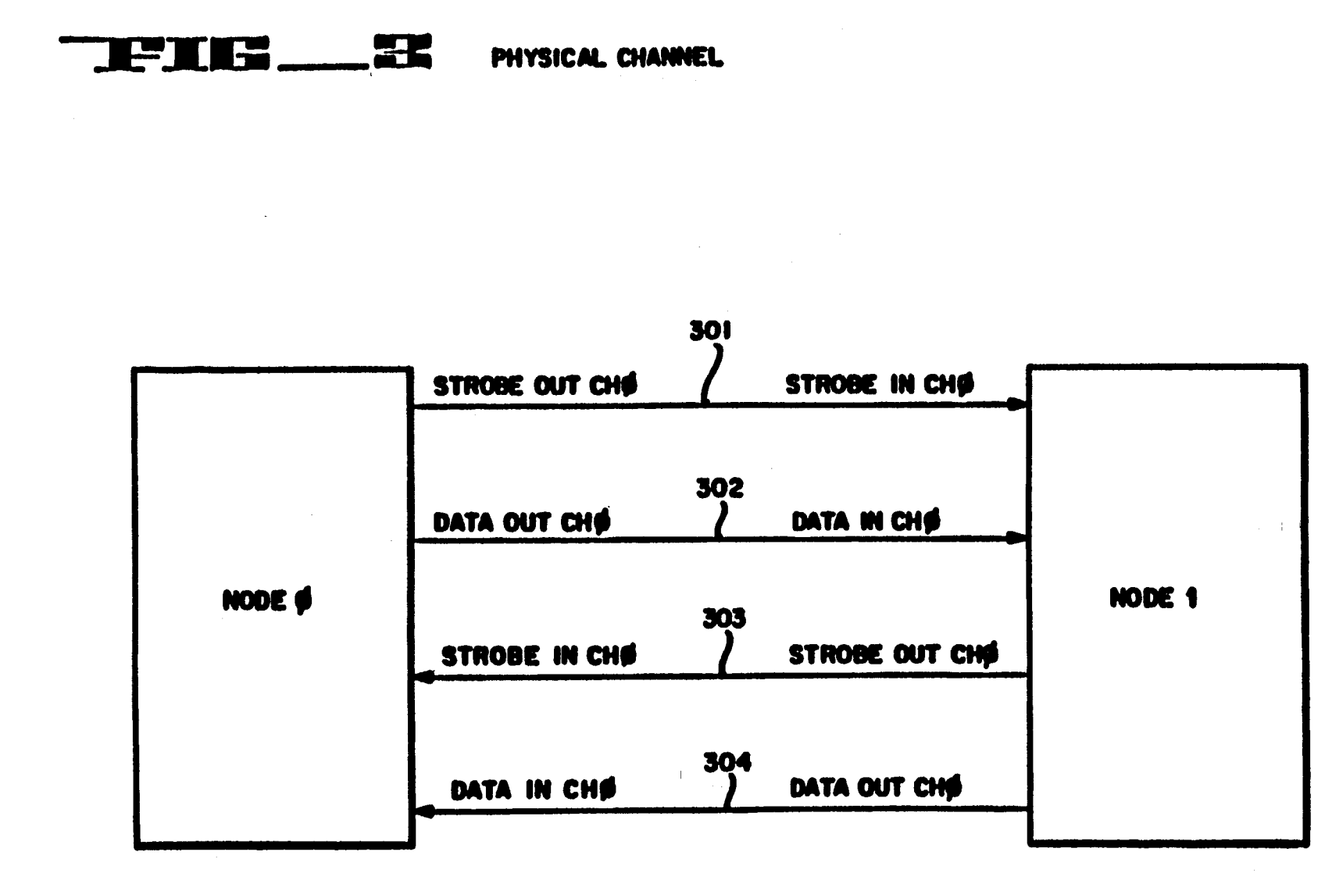
FIG. 3 is a block diagram illustrating a physical channel between nodes of the present invention.
Figure 3M:
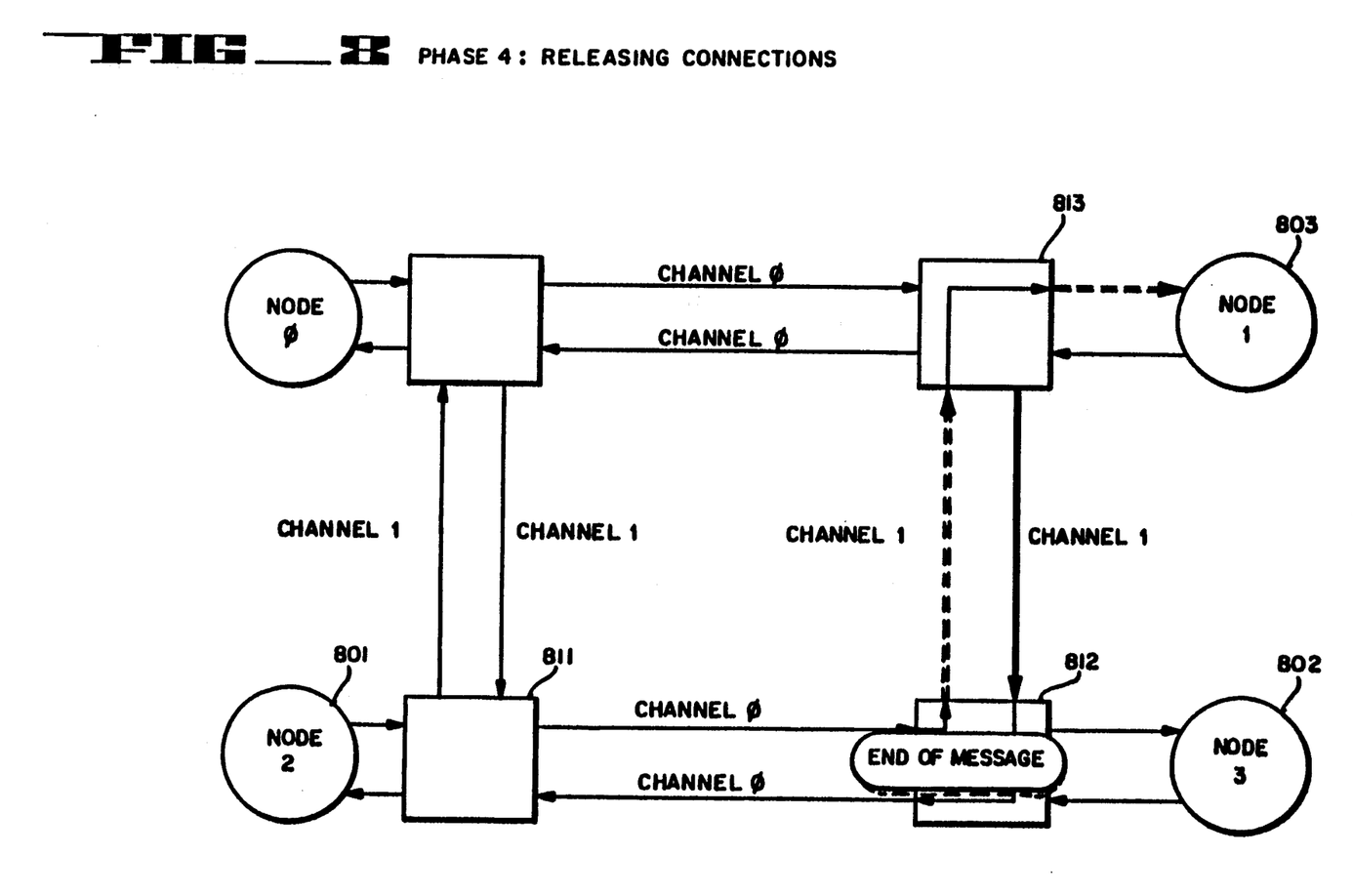

Channels in the preferred embodiment connect a router coupled with a node with each of the nodes nearest neighbor's routers. In the preferred embodiment, each channel comprises four conductors 301–304, as shown by FIG. 3. Labelling of the conductors in FIG. 3 may be understood with reference to node 0. Strobe out conductor 301 transmits strobe signals out from node 0. Data out conductors 303 transmit data signals from node 0. Strobe in conductor 303 is coupled to allow node 0 to receive strobe signals. Data in conductors 304 are coupled to allow node 0 to receive data signals. Thus, the conductors 301–304 may be thought of as comprises two pairs of conductors for each channels; a first comprising strobe out conductors 301 and data out conductors 302 and a second pair comprising stobe in conductors 303 and data in conductors 304. The pairs operate independently of each other.

Figure 4A:
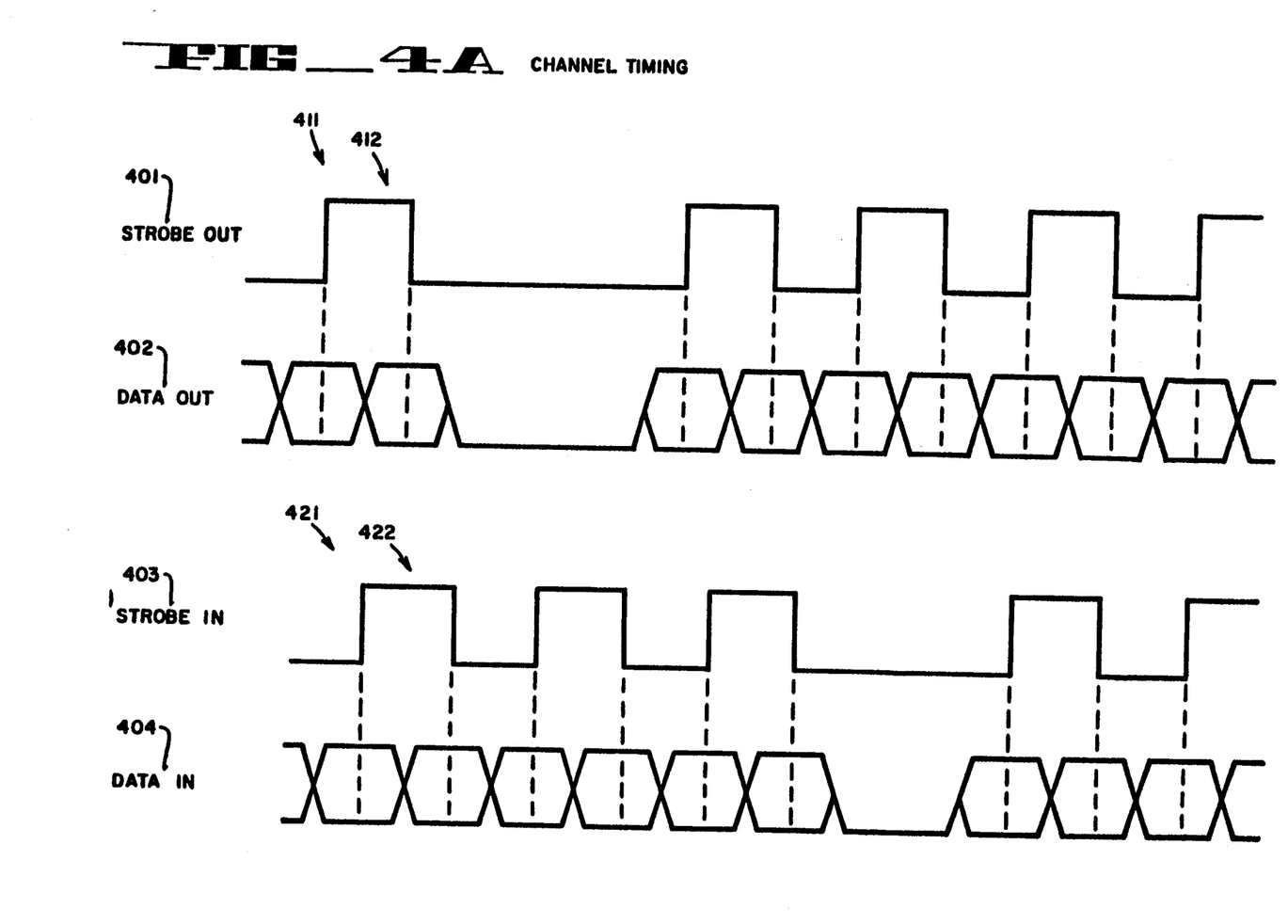
FIG. 4(a) is a timing diagram illustrating channel timing as may be utilized by the present invention.

Serial data, control and status bits are transferred across the data lines. The strobe lines are used to validate the data lines and also provide a clock source for the subsequent router. As can be seen with reference to FIG. 4(A), both rising edges, such as edges 411 and 421, and falling edges, such as edges 412 and 422, of strobe signals 401 and 403 are used to validate data lines 402 and 404.

In the present invention, the clock signal communicated over lines 301 and 303 is used to clock the associated data on lines 302 and 304, respectively. This clock signal is transmitted with the data over the entire message route. Using this technique of transmitting a clock signal with a data signal, data may always be controlled by a single clock while each node (and the router associated with the node) may operate on its own clock. A channel at a given node is controlled by the clock signal transmitted with the data it is receiving.

For example, with reference to FIG. 1, assume data is to be communicated from node 4 (address 100) to node 1 (address 001). Taking the Exclusive OR of 100 and 001 yields a relative address of 101. Therefore, the data will be routed from the serializer of node 4 to the channel 0 routing element of node 5. The data will then be routed out of the channel 0 routing element of node 5 on channel 2 to the channel 2 routing element of node 1.

During this process, a clock signal is generated by the serializer on node 4 which is transmitted along with the data over the strobe out line 301 of FIG. 3. This clock signal is received by the channel 0 routing element of node 5 and is used to control the channel 0 routing element. The clock is retransmitted with the data over channel 2 from the channel 0 routing element and is received by the channel 2 routing element of node 1. Thus, the clock follows the data throughout its transmission along the route.

As one advantage of the routing technique of the present invention over full handshake protocols, the technique of the present invention allows for a generally higher data transfer rate. Transfer rates of handshake protocols are generally lower because of latency caused by the required node-to-node acknowledgements and speed degradation as the channels are made physically longer. In the present invention, the use of FIFO buffers at the message destinations and having clock signals follow data signals throughout data transmission eliminates the need for handshake protocols.

Consequently, the throughput is not a function of channel length or acknowledgment delay. The data bandwidth of the preferred embodiment is 2.8 Mbytes/second.

In the present invention, two status/control bits are passed on a continuous repetitive basis, between nearest neighbor nodes, whether or not message transmission is occurring. These bits are END OF MESSAGE (EOM) and READY STATUS (RDY). The EOM bit indicates that the last word of the message has been transmitted. This bit is ignored unless a message is in progress. The RDY bit represents the state of readiness of the destination node of an established route.

EOM and RDY bits are passed in one of two formats: (1) a first format, illustrated by FIG. 4(B), allows the EOM bit 431 and RDY bit 432 to be interspersed within a data message 430 and (2) a second format, illustrated by FIG. 4(C), allows EOM bit 441 and RDY bit 442 to be passed in the absence of message traffic.

Figure 4B:
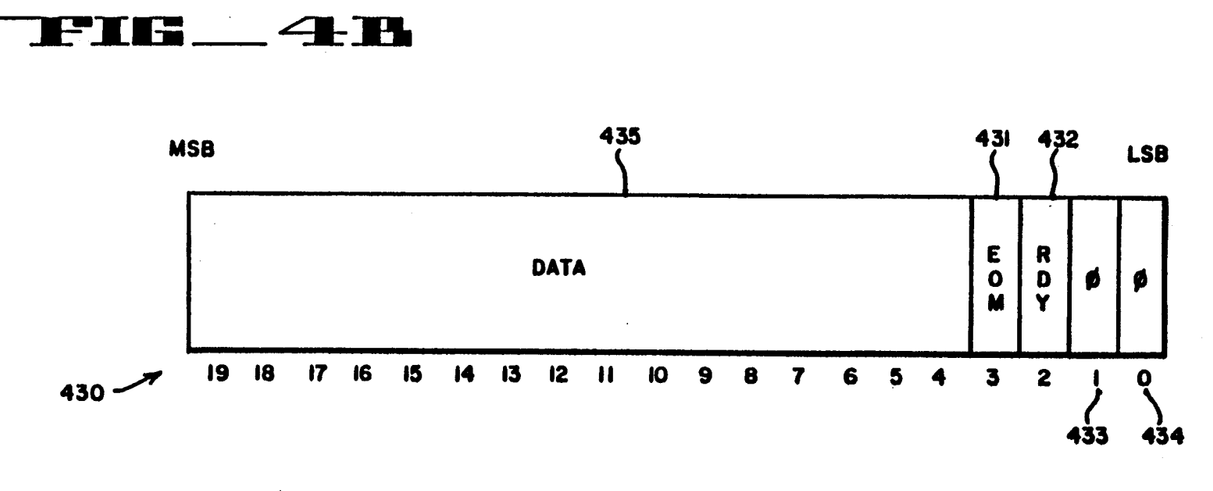
FIG. 4(b) is an illustration of a data format for transmission of data and status information as may be utilized by the present invention.

The first format comprises, in addition to the above-mentioned EOM bit 431 and RDY bit 432, two bits 433 and 434 for indicating the transfer is a data message transfer and sixteen data bits 435. In the preferred embodiment, the two bits 433 and 434 are set to 0 to indicate the message is a data transfer message.

Figure 4C:
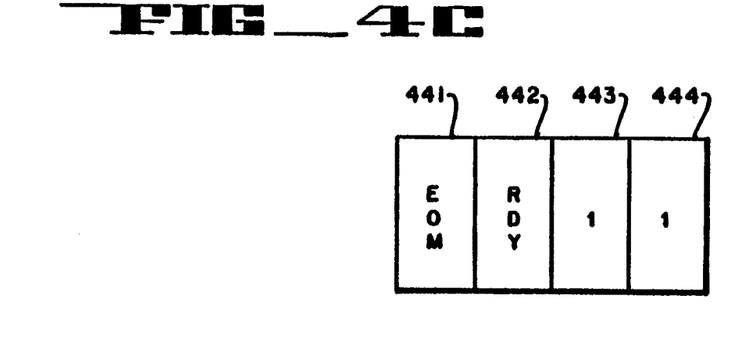
FIG. 4(c) is a illustration of a format for transmission of status information as may be utilized by the present invention.

The second format, referred to as a "status nibble", comprises four bits, the EOM bit 441, the RDY bit 442 and two bits 443 and 444 for indicating the format is a status only transfer. In the preferred embodiment, these two bits 443 and 444 are set to 1. During transmission of status nibbles, the EOM bit is ignored. Status nibbles are repetitively transmitted by all routers in the absence of a data transfer.

The RDY bit is stored as it is received at each router in a "Destination Ready" register and is used for flow control in the system as described in above.

As described above, the present invention utilizes two "start bits" 433 and 434 or 443 and 444, on both the status and data formats. Two bits are utilized because the message is processed in two halves by the routers. Odd numbered bits are processed independently from the even numbered bits in the router. This allows for higher data transfer rates than otherwise possible in the the gate arrays of the preferred embodiment.

As one advantage of status information being interspersed with message data in the message format of the present invention, the end of a message can easily be detected by routers on the fly. This eliminates the need for a message size counter in the routers and, thereby, removes any limits to maximum message size. Therefore, messages in the present invention may be of any arbitrary size.

Each message in the present invention involves one sending node and one receiving node. The routes that messages take through the network are unique between any two nodes. The combination of channels that compose a route are defined by the binary-cube routing algorithm as described by Herbert Sullivan and T. R. Bashkow, *A Large Scale Homogeneous, Fully Distributed Parallel Machine, Proceedings of the 4th Annual Symposium on Computer Architecture*, pp. 105–117, 1977. This algorithm is further described with reference to C. R. Lang, Jr., *The Extension of Object-Oriented Languages to a Homogeneous, Concurrent Architecture, Department of Computer Science, California Institute of Technology, Technical Report Number* 5014, May, 1982. Using such a binary-cube algorithm guarantees that no circular routes will occur in the message routing and, thus, prevents deadlock from occurring.

The algorithm states that in order to guarantee against deadlock, messages in binary cubes can be routed in increasingly higher dimensions until the destination is reached. The channel numbering defined above corresponds to these dimensions. Routes may consist of increasingly higher numbered channels, but are not necessarily be contiguous. Routing of messages from higher numbered channels to lower numbered channels (or channels of the same dimension) is not allowed. For instance, a route may consist of channel 0-channel 2-channel 3 which involves the routers of nodes 0, 1, 5 and 13. In this case the source router is at node 0, the intermediate routers are at nodes 1 and 5 and the destination router is at node 13.

A routing operation of the present invention can be broken into four phases: establishing a route, acknowledgement of the destination node being ready to receive a message, message transmission and releasing connections. To initiate the routing of a message, the source node transfers a minimum of one 32 bit word to the its router. The low order 16 bits of this first 32 bit word comprise a routing probe. The routing probe comprises addressing information and is used to establish the connections through intermediate routers which make up the route that the message takes. In the preferred embodiment, the high order eight bits of the routing probe are set to zeros.

The low order eight bits of the routing probe are calculated by taking the Exclusive OR of the binary address of the destination node and the source node. Each bit of the routing probe corresponds to a channel that the message can be routed on. (The preferred embodiment comprises a 7-dimensional binary cube, the eighth bit is used for addressing the external I/O channel.)

The first segment of the route is established when the serializer in the source router requests the outgoing channel that corresponds to the lowest order bit set in the routing probe. Requests for the same channel are arbitrated amongst local requestors by the arbiter. The arbiter grants one request at a time, using a "round robin" arbitration scheme. When the channel is granted, the routing probe is sent by the source router before any message transmission takes place.

For example, if a routing probe is transferred to the router in which bit N is the lowest order bit set, channel N will be requested. When the arbiter grants channel N, the routing probe will be transmitted to the intermediate router that is the nearest neighbor to the source node on channel N.

In the preferred embodiment, upon receiving the routing probe, the intermediate router stores the routing probe and discards the high order 8 bits (all of which are zeros) creating a short routing probe. The discarded bits will be reconstructed at the destination router. The short routing probe is passed between intermediate routers, reserving additional segments of the route.

Figure 5:
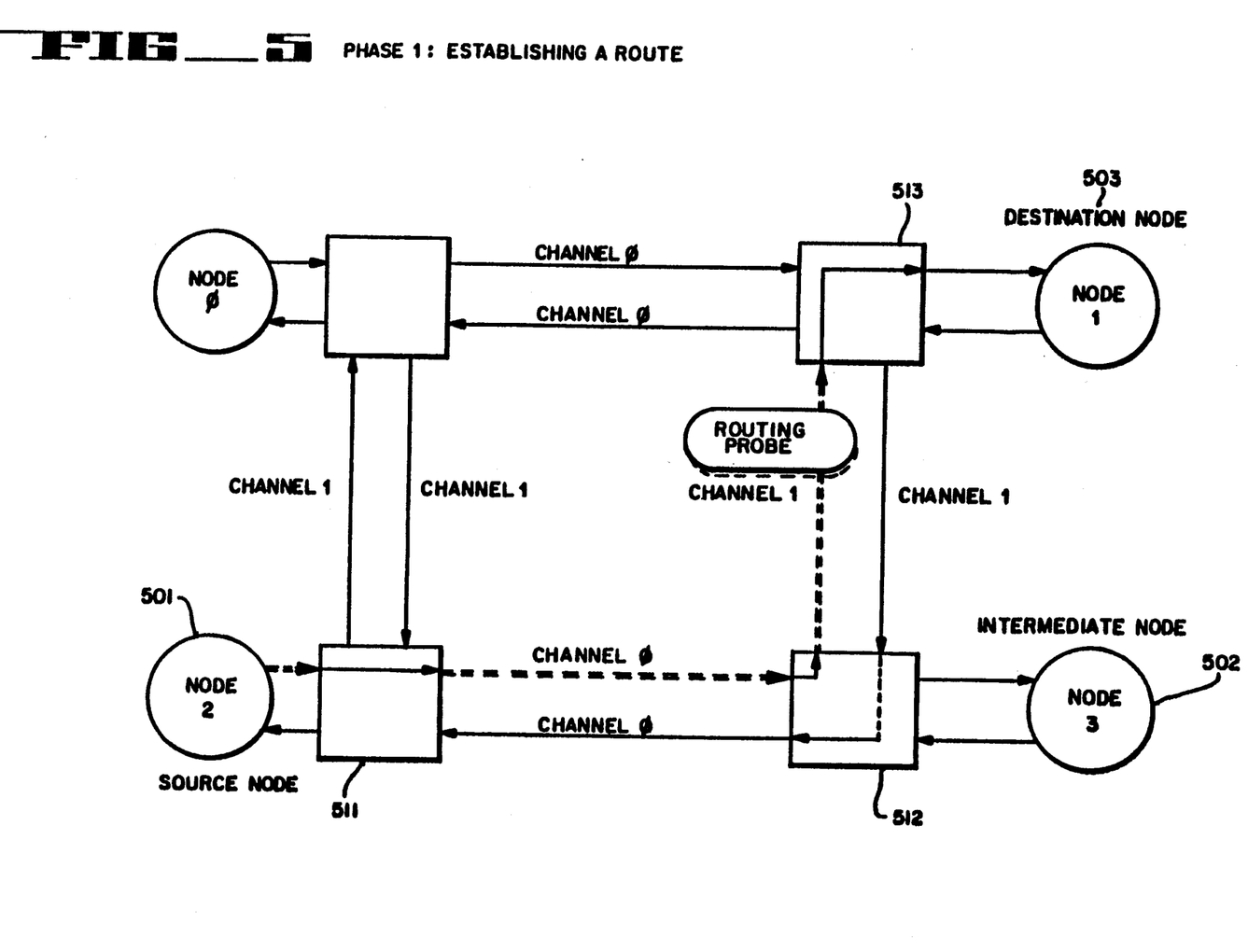
FIG. 5 is a diagram illustrating establishment of a communication route in a networked computer system as may be accomplished by the present invention.

The intermediate routers examine bits $N+1$ to bit 7 of the short routing probe to determine the lowest order bit that is set. The outgoing channel, corresponding to the the first bit that is set, will be requested and the short routing probe will wait. When the outgoing channel is granted, the short routing probe is transmitted to the next router in the route. As illustrated in FIG. 5, this process repeats until the routing probe is received by the destination router.

Referring to FIG. 5, a message is to be transmitted from source node 2 (binary address 10) 501 to destination node 1 (binary address 01) 503 in a 2-dimensional cube. The source node 501 transfers a routing probe to its router 511. As described above, the routing probe comprises the relative address of the source and destination nodes; thus, in the example of FIG. 5, the routing probe contains the address 11 (10 XOR 01=11). In this case, bit zero, corresponding to channel 0, is a 1. Thus, as described above, the routed probe requests channel 0 for transmission.

When the routing probe is granted access to channel 0, the routing probe is sent over channel 0 to router 512 corresponding to intermediate node 502. As described above, the routing algorithm of the present invention requires router 512 to send the routing probe out on a channel of higher dimension than it was received on. Therefore, router 512 begins examining bits of the router probe for 1 bits beginning with the bit in bit position 1 (the routing probe was received by router 512 on channel 0). After finding the first 1 bit, a request is made for the channel corresponding to the 1 bit. In the particular example, the first 1 bit is in bit position 1 and a request is made for channel 1.

The routing probe is transmitted on channel 1 to router 513 corresponding with destination node 503. Router 513 examines the routing probe beginning with the bits of higher dimension than the channel the routing probe was received on. In the illustrated example, all remaining bits are 0. Therefore, router 513 determines the routing probe has reached its final destination.

Router 513 pads the routing probe with eight zeros to restore it to its original state. If the destination router can accept a message, it will signal an acknowledgement, the RDY bit.

This begins the acknowledgement phase of the routing operation. The acknowledgement phase requires that a deterministic connection be made from the destination router back to the source router for the purpose of carrying flow control information. This is termed the "Status route" and follows exactly through the same intermediate nodes as the message route, but in the opposite direction, from the destination node to the source node.

For example, if a message routed from CHANNEL 2 IN to CHANNEL 4 OUT at an intermediate router, a connection from CHANNEL 4 IN to CHANNEL 2 OUT is made for the status route. The status route, like the message route, maintains its connection for the duration of the message.

Figure 6:
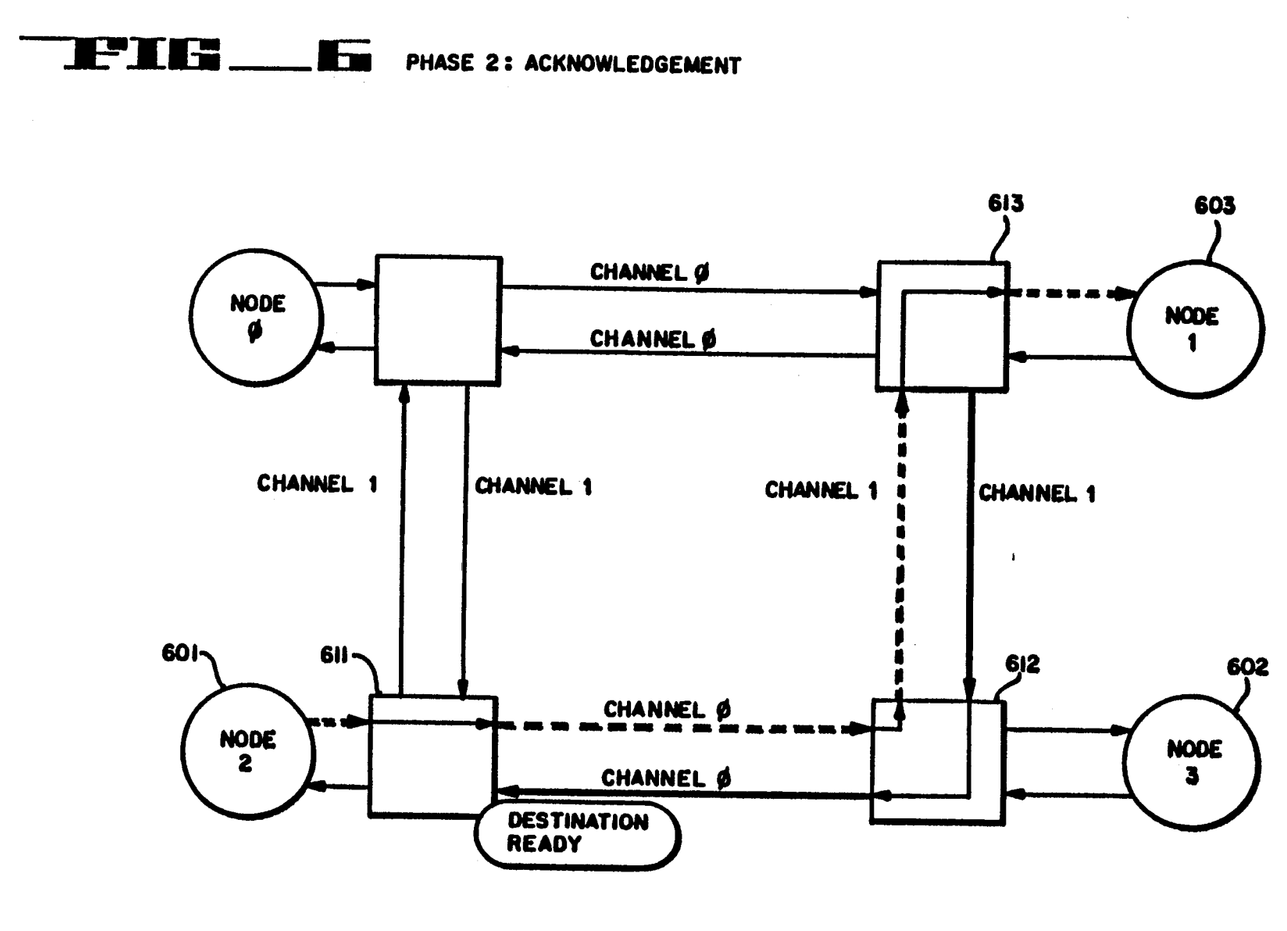
FIG. 6 is a diagram illustrating acknowledgement of establishment of a route in networked computer system as may be accomplished by the present invention.
Figure 7:
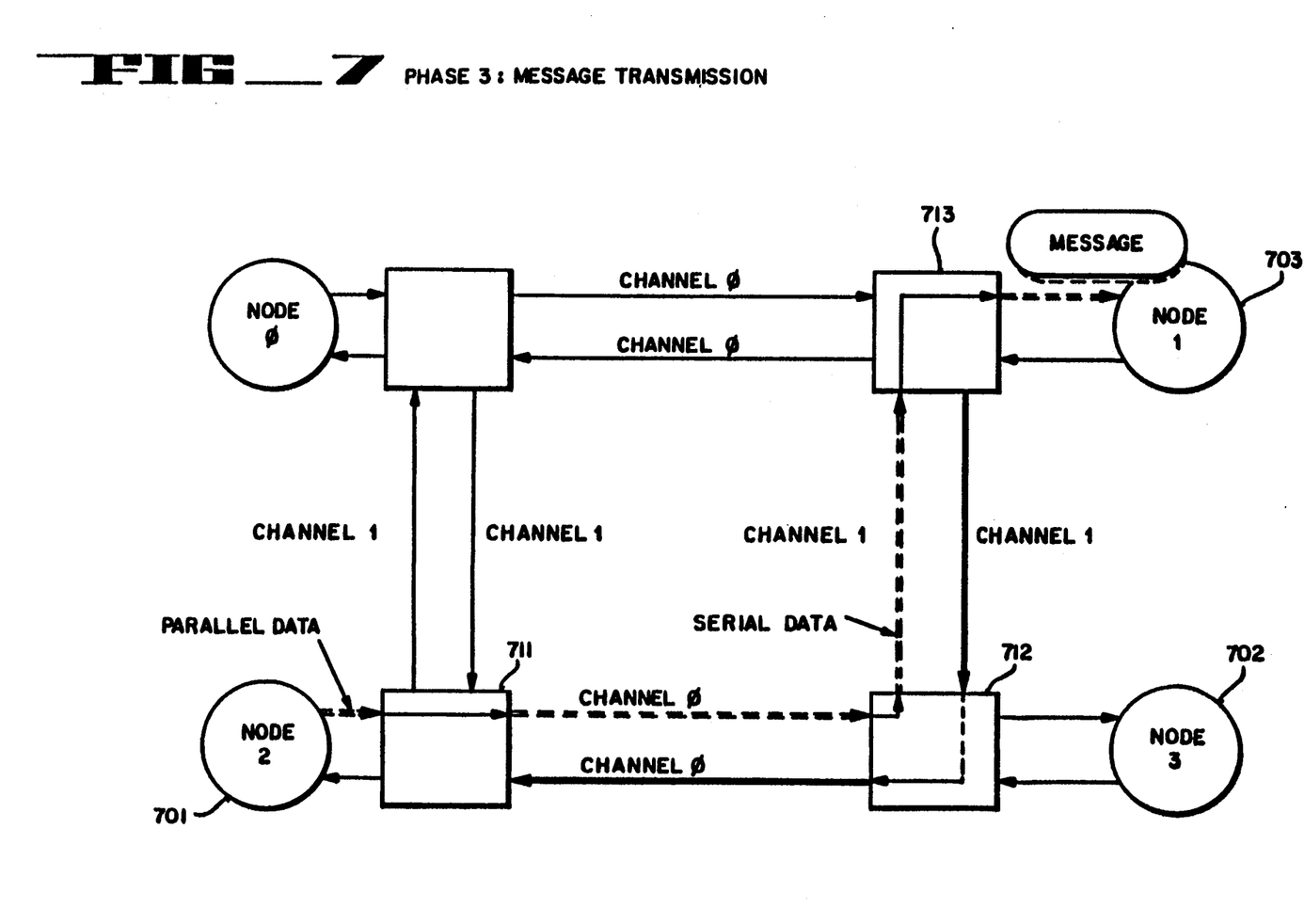
FIG. 7 is a diagram illustrating message transmission in a networked computer system as may be accomplished by the present invention.

FIG. 6 illustrates the acknowledgement phase of the routing operation of the present invention. In FIG. 6, node 601 corresponds to node 501 of FIG. 5; router 611 corresponds to router 511; node 602 corresponds to node 502, etc. FIGS. 7 and 8 have similar labelling correspondence.

As shown by FIG. 6, an acknowledgement is sent from router 613 (corresponding with destination node 1 603) over channel 1 to intermediate router 612. Intermediate router 612 forwards to acknowledgement to origin router 611 over channel 0 where it is received by node 2 601. As will be understood by one of ordinary skill in the art, RDY status information is transmitted in the formats discussed above. Therefore, message information from a different origin node may be transmitted simultaneously with the status information over the same channel. If there are no requests to use the same channel, a status nibble (discussed above) is transmitted.

When the RDY bit finally reaches the source node 601, the message transmission phase begins. The source ROUTER can transmit data continuously into the network (in the format described above) until the end of the message is sent or a not ready indication is received over the status route. In the preferred embodiment, messages are not buffered in the intermediate routers.

As can be seen with reference to FIG. 7, the message information is transmitted from node 2 701 to router 711 and then out the serializer of router 711. The message information is then transmitted over the reserved route (CHANNEL 0 to intermediate router 712, CHANNEL 1 to destination router 713). The message is then deserialized at router 713 and transmitted to destination node 703.

If, during transmission of the message, the source router 711 receives a not ready indication on incoming channel 0, it will discontinue transmission of the message and transmit status nibbles. When a ready indication is again received on incoming channel 0, the source router will again begin transmission of the message. In the preferred embodiment, the destination router stores any message information which is in transit at the time the not ready indication is active. Therefore, when a message is throttled by a not ready indication, no data bits remain stored on the network, but rather are stored in the FIFO buffer of the destination router. This method of throttling message transmission, by receiving an indication the destination node is not ready and suspending transmission of the message in response to such an indication, provides for flow control in the network of the present invention.

After completion of transmission of a message, the source router appends a checksum word to the message. The data format which contains the checksum word has the EOM bit set. The checksum provides a means to verify message integrity in order to detect hardware failures should they occur.

As shown in FIG. 8, the transmission of a word with the EOM bit set causes the source router 811 to release the outgoing channel (channel 0) reserved for the message. At each intermediate router in the route (router 812 in the illustrated example), the channel reserved for the message is released when the word with the EOM bit set is retransmitted. Those channels are then free to be used for other messages.

When a word with the EOM bit set is received at the destination router 813, it is assumed that the accompanying data information is the checksum for the message. The checksum information is used to verify the integrity of the message. Since the checksum information is not part of the original message, it is stripped off by the destination router 813. The result is stored for further inspection at the destination node 803.

Thus, a parallel processing computer system is described. Although the present invention has been described with specific reference to a number of details of the preferred embodiment, it will be obvious that a number of modifications and variations may be employed without departure from the scope and spirit of the present invention. Accordingly, all such variations and modifications are included within the intended scope of the invention as defined by the following claims.

I claim:

1. A computer system having a plurality of nodes for processing information, a first node including a first processor coupled to a first router, a second node including a second processor coupled to a second router, a third node including a third processor coupled to a third router, said system comprising:

a first channel coupling said first router to said second router;

a second channel coupling said second router to said third router, said first channel comprising:

a first channel data line for communicating data information from said first router to said second router;

a first channel clock line for communicating a clock signal from said first router to said second router;

a first channel reverse data line for communicating return information from said second router to said first router; and a first channel reverse clock line for communicating said clock signal from said second router to said first router;

said second channel comprising:

a second channel data line for communicating said data information from said second router to said third router;

a second channel clock line for communicating said clock signal from said second router to said third router;

a second channel reverse data line for communicating said return information from said third router to said second router; and a second channel reverse clock line for communicating said clock signal from said third router to said second router;

said second router comprising retransmitting means for retransmitting said clock signal communicated on said first channel clock line onto said second channel clock line, and for retransmitting said clock signal communicated on said second channel reverse clock line onto said first channel reverse clock line;

each router further comprising clocking means for using said clock signal to synchronously control the communication of said data information, and for using said clock signal to synchronously control the communication of said return information.

2. The computer system as recited by claim 1, wherein said return information is acknowledgment information.

* * * * *